(12) United States Patent
Chapeskie et al.

(10) Patent No.: US 10,216,274 B2
(45) Date of Patent: Feb. 26, 2019

(54) SYSTEMS, ARTICLES, AND METHODS FOR WEARABLE HUMAN-ELECTRONICS INTERFACE DEVICES

(71) Applicant: THALMIC LABS INC., Kitchener (CA)

(72) Inventors: Jake Chapeskie, Kitchener (CA); Stephen Lake, Kitchener (CA)

(73) Assignee: NORTH INC., Kitchener (CA)

( * ) Notice: Subject to any disclaimer, the term of this patent is extended or adjusted under 35 U.S.C. 154(b) by 0 days.

(21) Appl. No.: 14/743,536

(22) Filed: Jun. 18, 2015

(65) Prior Publication Data

US 2015/0370326 A1 Dec. 24, 2015

Related U.S. Application Data

(63) Continuation-in-part of application No. PCT/US2014/057029, filed on Sep. 23, 2014.
(Continued)

(51) Int. Cl.
*G06F 3/01* (2006.01)
*G06F 11/30* (2006.01)

(52) U.S. Cl.
CPC .............. *G06F 3/015* (2013.01); *G06F 3/017* (2013.01)

(58) Field of Classification Search
CPC .... G06F 3/017; G06F 3/04883; G06F 3/0487; G06F 3/0488; G06F 3/04886; G06F 2203/04808

See application file for complete search history.

(56) References Cited

U.S. PATENT DOCUMENTS 8,447,704 B2 * 5/2013 Tan .................. G06F 3/015
706/12
9,349,280 B2 * 5/2016 Baldwin ............ G08C 17/00
(Continued)

FOREIGN PATENT DOCUMENTS

EP        2 733 578 A2    5/2014
JP        2005-352739 A   12/2005
WO        2011/011750 A1  1/2011

OTHER PUBLICATIONS

International Search Report and Written Opinion, dated Feb. 24, 2015, for corresponding International Application No. PCT/US2014/057029, 12 pages.

*Primary Examiner* — William Lu
(74) *Attorney, Agent, or Firm* — Cozen O'Connor

(57) ABSTRACT

Systems, articles, and methods for wearable human-electronics interfaces are described. A wearable human-electronics interface device includes a band that in use is worn on an appendage (e.g., a wrist, arm, finger, or thumb) of a user. The band carries multiple sensors that are responsive to vibrations. The sensors are physically spaced apart from one another on or within the band. The band also carries an on-board processor. The sensors detect vibrations at the appendage of the user when the user performs different finger tapping gestures (i.e., tapping gestures involving different individual fingers or different combinations of fingers) and provide corresponding vibration signals to the processor. The processor classifies the finger tapping gesture(s) based on the vibration signals and an on-board transmitter sends a corresponding signal to control, operate, or interact with a receiving electronic device. The sensors include inertial sensors, digital MEMS microphones, or a combination thereof.

22 Claims, 9 Drawing Sheets

Related U.S. Application Data

(60) Provisional application No. 62/015,937, filed on Jun. 23, 2014.

(56) References Cited

U.S. PATENT DOCUMENTS

| | | | |
|---|---|---|---|
| 2002/0009972 A1* | 1/2002 | Amento | G06F 3/017 455/66.1 |
| 2002/0120415 A1* | 8/2002 | Millott | F16F 15/00 702/69 |
| 2005/0179644 A1 | 8/2005 | Alsio et al. | |
| 2008/0001735 A1* | 1/2008 | Tran | G06F 19/3418 340/539.22 |
| 2009/0326406 A1* | 12/2009 | Tan | G06F 3/015 600/546 |
| 2010/0066664 A1* | 3/2010 | Son | G06F 1/163 345/156 |
| 2012/0275621 A1* | 11/2012 | Elko | H04R 19/016 381/92 |
| 2014/0258864 A1* | 9/2014 | Shenoy | G06F 3/043 715/716 |
| 2015/0242120 A1* | 8/2015 | Rodriguez | G06F 3/04886 345/174 |

\* cited by examiner

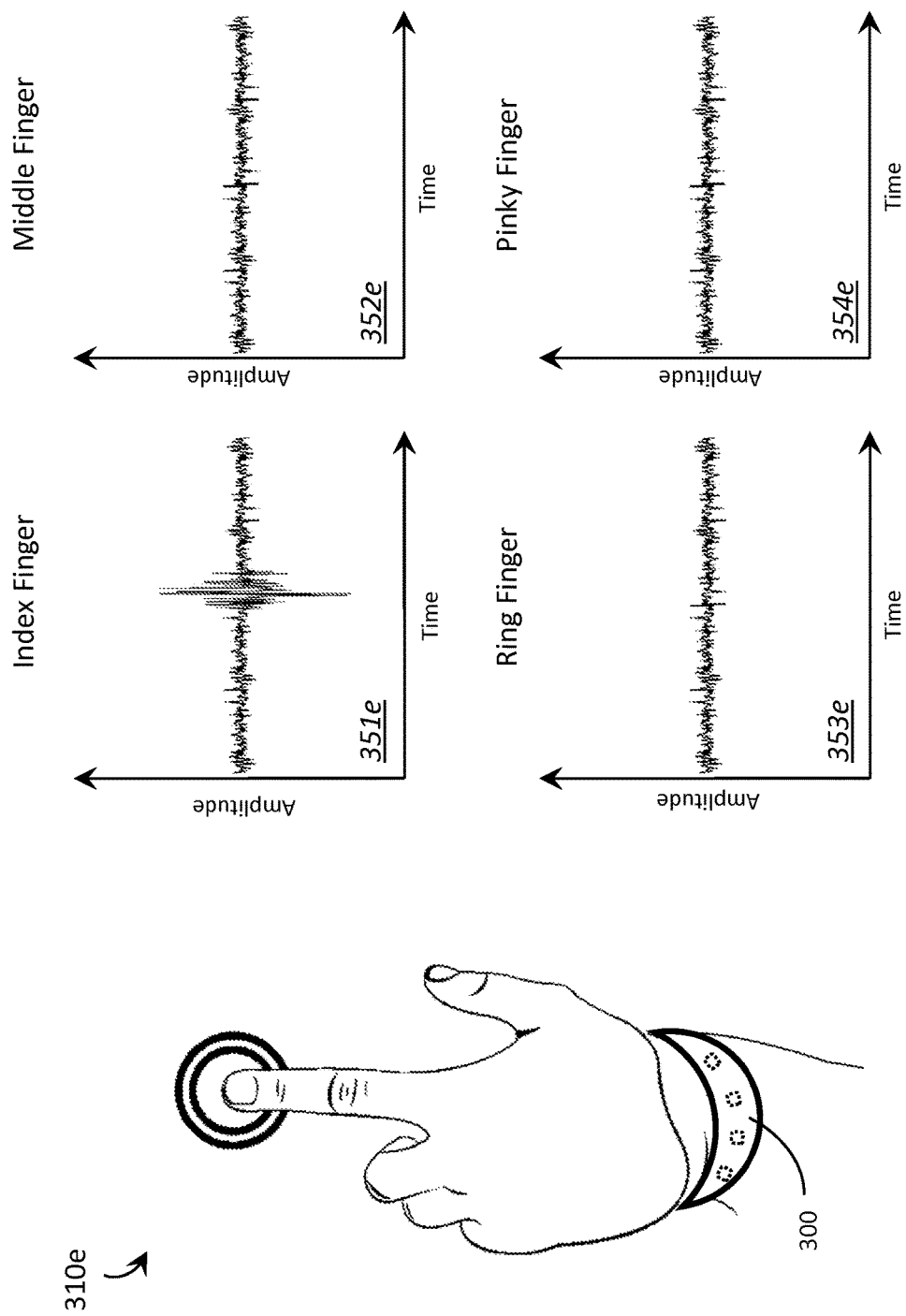

SYSTEMS, ARTICLES, AND METHODS FOR WEARABLE HUMAN-ELECTRONICS INTERFACE DEVICES

BACKGROUND

Technical Field

The present systems, articles, and methods generally relate to wearable human-electronics interface devices and particularly relate to electronic bands that employ multiple microelectromechanical systems ("MEMS") microphones to detect and distinguish between different types of tapping gestures.

Description of the Related Art

Wearable Electronic Devices

Electronic devices are commonplace throughout most of the world today. Advancements in integrated circuit technology have enabled the development of electronic devices that are sufficiently small and lightweight to be carried by the user. Such "portable" electronic devices may include on-board power supplies (such as batteries or other power storage systems) and may be designed to operate without any wire-connections to other electronic systems; however, a small and lightweight electronic device may still be considered portable even if it includes a wire-connection to another electronic system. For example, a microphone may be considered a portable electronic device whether it is operated wirelessly or through a wire-connection.

The convenience afforded by the portability of electronic devices has fostered a huge industry. Smartphones, audio players, laptop computers, tablet computers, and ebook readers are all examples of portable electronic devices. However, the convenience of being able to carry a portable electronic device has also introduced the inconvenience of having one's hand(s) encumbered by the device itself. This problem is addressed by making an electronic device not only portable, but wearable.

A wearable electronic device is any portable electronic device that a user can carry without physically grasping, clutching, or otherwise holding onto the device with their hands. For example, a wearable electronic device may be attached or coupled to the user by a strap or straps, a band or bands, a clip or clips, an adhesive, a pin and clasp, an article of clothing, tension or elastic support, an interference fit, an ergonomic form, etc. Examples of wearable electronic devices include digital wristwatches, electronic armbands, electronic rings, electronic ankle-bracelets or "anklets," head-mounted electronic display units, hearing aids, and so on.

Human-Electronics Interfaces

The term "human-electronics interface" refers to a communicative link through and/or by which a user (i.e., a human) may control, operate, and/or generally interact with one or more electronic device(s). Typically, a first electronic device (e.g., a "controller") detects input from the user and transmits one or more signal(s) to a second electronic device in order to control, operate, and/or interact with the second electronic device in response to the input from the user. Throughout this specification and the appended claims, the term "human-electronics interface device" is generally used to refer to an electronic device (i.e., the "first" electronic device or "controller" (i.e., electronic controller) in the description above) that effects a human-electronics interface by detecting input from a user and transmitting one or more signals in order to control another electronic device based on the detected input. A human-computer interface ("HCI") is an example of a human-electronics interface. The present systems, articles, and methods may be applied to HCIs, but may also be applied to any other form of human-electronics interface.

A portable electronic device may provide direct functionality for a user (such as audio playback, data display, computing functions, etc.) without encumbering the user's hand(s). However, this feature is of limited value if, as is often the case (e.g., for laptop computers, tablet computers, portable music players, mobile phones, smartphones, and so on) the user is still generally required to take the device in their hand(s) in order to control, operate, and/or interact with the device, e.g., by pushing buttons or keys on-board the device. It is likewise disadvantageous for a user to encumber their hand(s) in order to effect control of a non-portable electronic device, such as control of a wall-mounted television set via a handheld remote control. Hands-free remote control schemes available today (such as voice control, camera-based gesture control, and the like) are typically very unreliable. This unreliability typically arises, at least in part, because the hands-free remote control schemes available today rely on the successful detection and identification of complicated patterns through complicated machine learning algorithms that process highly variable (e.g., highly user-specific) data. There is a need in the art for simple human-electronics interface devices that do not encumber the user's hand(s) but nevertheless enable the user to consistently and reliably control the interface.

BRIEF SUMMARY

A method of operating a wearable human-electronics interface device, the device comprising a band that in use is worn around an appendage (e.g., a wrist, arm, finger, or thumb) of a user, a set of sensors (e.g., microelectromechanical systems ("MEMS") microphones) carried by the band and physically spaced apart from one another, a processor carried by the band and communicatively coupled to each sensor in the set of sensors, and a (wireless) transmitter carried by the band and communicatively coupled to the processor, may be summarized as including: detecting, by at least one sensor in the set of sensors, a vibration at the appendage of the user in response to a tapping gesture made by the user, the tapping gesture involving at least one finger of the user; providing at least one vibration signal from the at least one sensor that detects the vibration to the processor, wherein a composition of the at least one vibration signal depends at least in part on the at least one finger involved in the tapping gesture; classifying, by the processor, the tapping gesture based at least in part on the at least one vibration signal; and (wirelessly) transmitting at least one interfacial signal by the transmitter based at least in part on classifying the tapping gesture by the processor.

The human-electronics interface device may include at least one inertial sensor carried by the band and communicatively coupled to the processor, and the method may further include: detecting, by the at least one inertial sensor, motion of the appendage of the user in response to the tapping gesture made by the user; and providing at least one displacement signal from the at least one inertial sensor to the processor. In this case, classifying, by the processor, the tapping gesture based at least in part on the at least one vibration signal may include classifying, by the processor, the tapping gesture based at least in part on both the at least one vibration signal and the at least one displacement signal.

The method may include detecting, by the at least one inertial sensor, the vibration at the appendage of the user in response to the tapping gesture made by the user. The method may further include: detecting, by the at least one inertial sensor, a displacement of the appendage; providing at least one displacement signal from the at least one inertial sensor that detects the displacement to the processor; classifying, by the processor, the displacement based at least in part on the at least one displacement signal; and (wirelessly) transmitting at least one interfacial signal by the transmitter based at least in part on classifying the displacement by the processor. Alternatively, the method may include: detecting, by the at least one inertial sensor, a displacement of the appendage in response to the tapping gesture; and providing at least one displacement signal from the at least one inertial sensor that detects the displacement to the processor, and wherein classifying, by the processor, the tapping gesture based at least in part on the at least one vibration signal includes classifying, by the processor, the tapping gesture based at least in part on both the at least one vibration signal and the at least one displacement signal.

When the device includes at least one inertial sensor, the method may include: detecting, by the at least one inertial sensor, a rotation of the appendage upon which the device is worn; providing at least one rotation signal from the at least one inertial sensor that detects the rotation to the processor; classifying, by the processor, the rotation based at least in part on the at least one rotation signal; and (wirelessly) transmitting at least one interfacial signal by the transmitter based at least in part on classifying the rotation by the processor. Alternatively, the method may include: detecting, by the at least one inertial sensor, a rotation of the appendage in response to the tapping gesture; and providing at least one rotation signal from the at least one inertial sensor that detects the rotation to the processor, and wherein classifying, by the processor, the tapping gesture based at least in part on the at least one vibration signal includes classifying, by the processor, the tapping gesture based at least in part on both the at least one vibration signal and the at least one rotation signal.

Detecting, by the at least one inertial sensor, the vibration and/or motion at the appendage of the user in response to the tapping gesture made by the user may include detecting at least one vibrational impulse at the appendage of the user caused by the tapping gesture.

The wearable human-electronics interface device may include a non-transitory processor-readable storage medium carried by the band and communicatively coupled to the processor, and the non-transitory processor-readable storage medium may store processor-executable tapping gesture classification instructions. In this case, the method may include executing the processor-executable tapping gesture classification instructions by the processor to cause the processor to classify the tapping gesture based at least in part on the at least one vibration signal.

The transmitter may include a wireless transmitter, and transmitting at least one interfacial signal by the transmitter based at least in part on classifying the tapping gesture by the processor may include wirelessly transmitting at least one interfacial signal by the wireless transmitter based at least in part on classifying the tapping gesture by the processor.

The set of sensors may include at least one MEMS microphone, and detecting, by at least one sensor in the set of sensors, a vibration at the appendage of the user in response to a tapping gesture made by the user may include detecting, by the at least one MEMS microphone, the vibration at the appendage of the user in response to the tapping gesture made by the user. The human-electronics interface device may further include a vibration source carried by the band, and the method may include: at least partially cancelling a background vibration at the appendage of the user, the background vibration caused by at least one ambient source other than the tapping gesture. At least partially cancelling the background vibration may include generating an interference vibration by the vibration source that destructively interferes with at least a portion of the background vibration at the appendage of the user.

The set of sensors may include a first sensor and at least a second sensor (e.g., a first MEMS microphone and at least a second MEMS microphone). Detecting, by at least one sensor in the set of sensors, a vibration at the appendage of the user in response to a tapping gesture made by the user may include detecting, by the first sensor and the at least a second sensor, the vibration at the appendage of the user. Providing at least one vibration signal from the at least one sensor that detects the vibration to the processor may include providing a first vibration signal from the first sensor to the processor and providing at least a second vibration signal from the at least a second sensor to the processor. Classifying, by the processor, the tapping gesture based at least in part on the at least one vibration signal may include classifying, by the processor, the tapping gesture based at least in part on the first vibration signal and the at least a second vibration signal. Classifying, by the processor, the tapping gesture based at least in part on the first vibration signal and the at least a second vibration signal may include at least one of: determining, by the processor, the relative amplitudes of the first vibration signal and the second vibration signal; determining, by the processor, a temporal difference between at least one feature of the first vibration signal and at least one feature of the second vibration signal; determining, by the processor, a phase difference between at least one feature of the first vibration signal and at least one feature of the second vibration signal; comparing, by the processor, the first vibration signal and the at least a second vibration signal to at least one template that is representative of a defined tapping gesture; and/or executing, by the processor, a pattern recognition algorithm that classifies the tapping gesture based at least in part on the first vibration signal and the at least a second vibration signal.

The set of sensors may include at least four sensors (e.g., at least four MEMS microphones), at least one sensor positioned in each respective quadrant of a perimeter of the band when the band is worn around the appendage of the user. In this case, detecting, by at least one sensor in the set of sensors, a vibration at the appendage of the user in response to a tapping gesture made by the user may include detecting, by at least one respective sensor in each respective quadrant of the perimeter the band, the vibration at the appendage of the user in response to the tapping gesture made by the user.

The set of sensors may include a set of non-contact, substantially omnidirectional MEMS microphones and detecting, by at least one sensor in the set of sensors, a vibration at the appendage of the user in response to a tapping gesture made by the user may include detecting, by at least one non-contact, substantially omnidirectional MEMS microphone in the set of non-contact, substantially omnidirectional MEMS microphones, a vibration at the appendage of the user in response to a tapping gesture made by the user.

Detecting, by at least one sensor in the set of sensors, a vibration at the appendage of the user in response to a tapping gesture made by the user may include detecting at least one of: a muscle vibration at the appendage of the user in response to the tapping gesture made by the user; a tendon vibration at the appendage of the user in response to the tapping gesture made by the user; a bioacoustic vibration at the appendage of the user in response to the tapping gesture made by the user; and/or a mechanical vibration at the appendage of the user in response to the tapping gesture made by the user.

The appendage of the user around which the human-electronics interface device is, in use, worn may be selected from a group consisting of: an arm of the user, a wrist of the user, a finger of the user, and a thumb of the user.

A human-electronics interface device may be summarized as including: a band that, in use, is worn around an appendage (e.g., a wrist, arm, finger, or thumb) of a user; a set of sensors (e.g., MEMS microphones) carried by the band, each sensor in the set of sensors physically spaced apart from the other sensors in the set of sensors, and each sensor in the set of sensors responsive to vibrations at the appendage of the user when the user performs a tapping gesture involving at least one finger; a processor carried by the band and communicatively coupled to each sensor in the set of sensors; and a (wireless) transmitter carried by the band and communicatively coupled to the processor.

The human-electronics interface device may further include an inertial sensor, such as an accelerometer, a gyroscope, and/or an inertial measurement unit. The human-electronics interface device may further include a non-transitory processor-readable storage medium carried by the band and communicatively coupled to the processor, wherein the non-transitory processor-readable storage medium stores processor-executable tapping gesture classification instructions that, when executed by the processor, cause the processor to classify the tapping gesture performed by the user based at least in part on at least one signal provided from at least one sensor in the set of sensors to the processor in response to the tapping gesture. The transmitter may include a wireless transmitter.

The human-electronics interface device may include a display unit carried by the band and communicatively coupled to the processor. The band may be or include a watchstrap.

The human-electronics interface device may further include at least one component selected from the group consisting of: a battery, an amplification circuit communicatively coupled in between at least one sensor in the set of sensors and the processor, a filtering circuit communicatively coupled in between at least one sensor in the set of sensors and the processor, a digital-to-analog conversion circuit communicatively coupled in between at least one sensor in the set of sensors and the processor, and a vibration source carried by the band.

The set of sensors may include at least four MEMS microphones, at least one MEMS microphone positioned in each respective quadrant of a perimeter of the band when the band is worn around the appendage of the user. The set of MEMS microphones may include a set of non-contact, substantially omnidirectional MEMS microphones.

Each sensor in the set of sensors may be responsive to at least one of: a muscle vibration at the appendage of the user in response to the tapping gesture made by the user; a tendon vibration at the appendage of the user in response to the tapping gesture made by the user; a bioacoustic vibration at the appendage of the user in response to the tapping gesture made by the user; and/or a mechanical vibration at the appendage of the user in response to the tapping gesture made by the user.

The band may be sized and dimensioned to, in use, be worn around an appendage of the user selected from a group consisting of: an arm of the user, a wrist of the user, a finger of the user, and a thumb of the user.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not necessarily drawn to scale, and some of these elements are arbitrarily enlarged and positioned to improve drawing legibility. Further, the particular shapes of the elements as drawn are not necessarily intended to convey any information regarding the actual shape of the particular elements, and have been solely selected for ease of recognition in the drawings.

FIG. 3E is an illustrative diagram depicting the same exemplary arrangement from FIG. 3A for a fifth finger tapping gesture.

DETAILED DESCRIPTION

Figure 1:
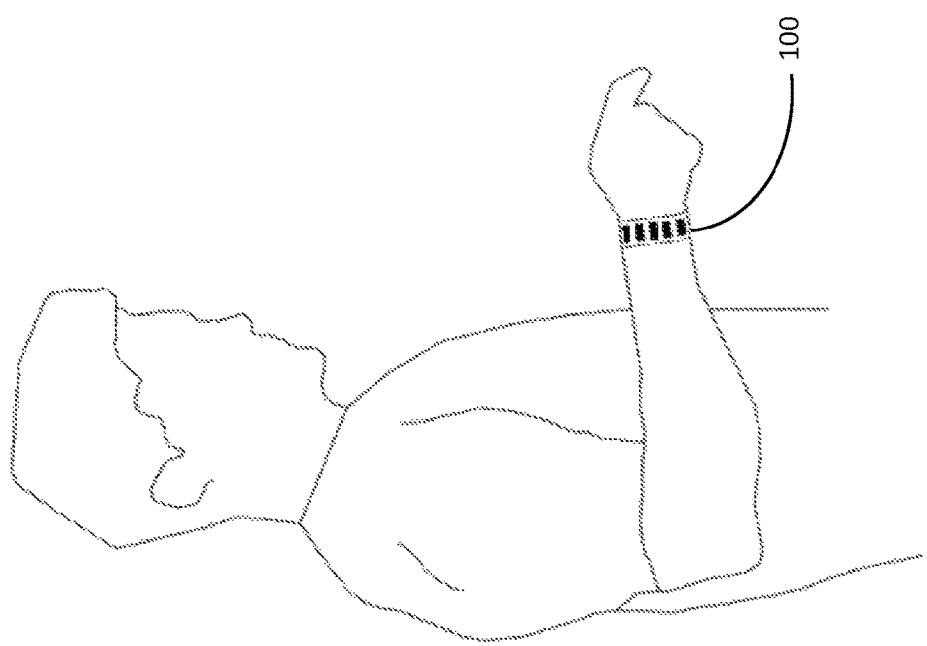
FIG. 1 is a side plan view that illustrates a user wearing an exemplary wearable human-electronics interface device in accordance with the present systems, articles, and methods.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with electronic devices, and in particular portable electronic devices such as wearable electronic devices, have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its broadest sense, that is as meaning "and/or" unless the content clearly dictates otherwise.

The headings and Abstract of the Disclosure provided herein are for convenience only and do not interpret the scope or meaning of the embodiments.

The various embodiments described herein provide systems, articles, and methods for wearable human-electronics interface devices that enable a user to achieve reliable control of another electronic device. More specifically, an electronic band that carries multiple spaced-apart sensors detects and distinguishes between different tapping gestures that a user may perform using different fingers (and/or different combinations of fingers). The tapping gestures take the form of a user's finger or fingers striking an object or surface other than the electronic band, for example striking a surface of a table, tablet device, eyewear, other finger, thumb, or portion of the user's own body, or other object which is separate, distinct, and not part of the electronic band. In response to each identified tapping gesture, the device transmits a corresponding signal that, when received and processed by a "downstream" electronic device, enables the user to easily control, operate, or otherwise interact with the downstream electronic device without encumbering their hand(s). The relative positioning of the multiple sensors on or within the band produces distinguishable sensor signals when the user taps with different fingers and/or different combinations of fingers without requiring computationally-difficult pattern matching techniques (relative to other hands-free control schemes such as voice control and camera-based gesture control), and thereby enables reliable signal detection and classification.

FIG. 1 is a side plan view that illustrates a user wearing an exemplary wearable human-electronics interface device 100 in accordance with the present systems, articles, and methods. Exemplary device 100 is an annular wristband shown worn, in use, on one of the user's wrists, though a person of skill in the art will appreciate that the teachings described herein may readily be applied in annular wearable electronic devices comprising a band designed to be worn around any appendage of the body of the user, including without limitation: on the upper arm, wrist, hand, finger, thumb, leg, foot, or neck of the user, and/or in non-annular wearable electronic devices. For the remainder of this specification, an electronic wristband 100 (i.e., an electronic device comprising a band that, in use, is worn around a wrist of a user) is used as an illustrative example of a human-electronics interface device taught herein without in any way precluding application of the present systems, articles, and methods in an electronic device comprising a band that, in use, is worn around another appendage of the user, such as around an arm of the user, around a finger of the user, or around a thumb of the user.

As discussed in more detail below, device 100 includes a set of sensors carried by (i.e., on and/or within) the wristband, and a processor communicatively coupled to the sensors. The sensors are spaced-apart on the wristband (e.g., around at least a portion of the circumference of the user's wrist) and, as a result of this spacing, each sensor uniquely detects (or uniquely does not detect) components of various tapping gestures performed by the user's fingers. As described in more detail later on, the on-board processor is able to distinguish between different tapping gestures depending on, for example, which finger or fingers perform the tapping.

Figure 2:
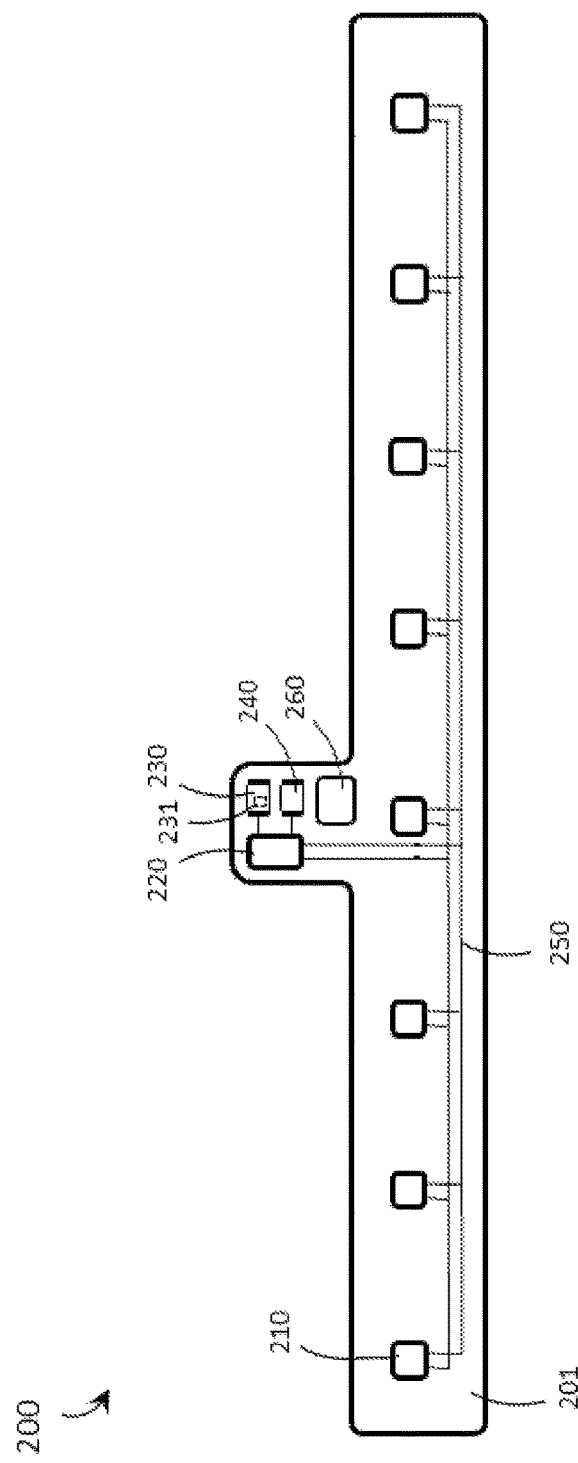
FIG. 2 is a schematic diagram of an exemplary wearable human-electronics interface device in accordance with the present systems, articles, and methods.

FIG. 2 is a schematic diagram of an exemplary wearable human-electronics interface device 200 in accordance with the present systems, articles, and methods. Device 200 comprises a band 201 formed of a flexible material that, in use, may bend to encircle a user's wrist as depicted in FIG. 1. As previously described, in alternative implementations such a band 201 may be sized and dimensioned to encircle a different appendage of the user, such as an arm of the user, a finger of the user, or a thumb of the user. Likewise, in alternative implementations a band 201 may be substantially rigid as opposed to flexible and/or may be fixed in an annular ring configuration.

Band 201 may comprise a wide-range of materials, including without limitation: flexible printed circuit board material (e.g., polyamide, polyimide, and/or polyamide-imide), a cloth or fabric, leather, woven plastic, and/or rubber. In some implementations, band 201 may be a watchstrap and the material composition of band 201 may include any known watchstrap composition. In alternative implementations, band 201 may be a ring (i.e., to be worn on a finger or thumb) in a fixed annular geometry and the material composition of band 201 may include any known ring composition (including, without limitation, metal). Though not depicted in FIG. 2, band 201 may provide physical coupling (e.g., pairwise coupling) between a set of links or pod structures akin to some watchstrap designs. Though also not depicted in FIG. 2, the respective ends of band 201 may include latch or clasp mechanisms (or magnets, or other connecting means) to close and hold band 201 in an annular arrangement around a circumference of the user's wrist when device 200 is worn by the user.

Band 201 carries the electronic components of device 200. Specifically, band 201 carries a set of sensors 210 (only one called in FIG. 2 though in the illustrated embodiment the set of sensors 210 includes eight discrete sensors 210). Sensors 210 are spaced-apart from one another so that they are distributed over at least a portion of the circumference of the user's wrist when band 201 is worn around the wrist of the user. In some implementations, each region of band 201 that carries a sensor 210 may include a rigid or semi-rigid material, such as printed circuit board material like FR4, in order to support and/or provide a reliable solder connection to the corresponding sensor 210.

Each sensor 210 is communicatively coupled (e.g., electrically communicatively coupled) to a processor 220 (e.g., a central processing unit, a digital microcontroller, a digital signal processor, or similar) carried by band 201. Processor 220 is communicatively coupled to a non-transitory processor-readable medium or memory 230 that is also carried by band 201, and memory 230 stores processor-executable "tapping gesture classification instructions" 231 that, when executed by processor 220, cause processor 220 to process and classify one or more signal(s) from one or more sensor(s) 210 in accordance with the present systems, articles, and methods. Processor 220 is also communicatively coupled to a transmitter 240 carried by band 201. Transmitter 240 may include any type(s) of signal transmitter(s) and/or communication terminal(s), including without limitation: a wireless transmitter (e.g., a wireless transceiver) that implements a wireless communication protocol such as Bluetooth®, Zigbee®, NFC, or the like, and/or a tethered connector port such as a Universal Serial Bus port, a mini-Universal Serial Bus port, a micro-Universal Serial Bus port, a SMA port, a THUNDERBOLT® port, or the like. In response to processing and classifying one or more signal(s) from one or more of sensors 210, processor 220 may control, instruct, or otherwise cause transmitter 240 to transmit at least one interfacial signal that, when received by at least one downstream receiving electronic device (not shown in FIG. 2), effects an interaction between the user and the at least one downstream receiving electronic device. In this general way, device 200 serves as a "human-electronics interface device" that establishes a "human-electronics interface" between the user and the at least one downstream receiving electronic device.

Exemplary device 200 also includes a portable power source (e.g., a battery) 260 carried by band 201 to power the various electronic components (e.g., sensors 210, processor 220, transmitter 240) of device 200. In various implementations, band 201 may include one or more circuits (such as an amplification circuit, a filtering circuit, and/or a digital-to-analog conversion circuit) communicatively coupled in between any or all of sensors 210 and processor 220.

Throughout this specification and the appended claims the term "communicative" as in "communicative pathway," "communicative coupling," and in variants such as "communicatively coupled," is generally used to refer to any engineered arrangement for transferring and/or exchanging information. Exemplary communicative pathways include, but are not limited to, electrically conductive pathways (e.g., electrically conductive wires, electrically conductive traces), magnetic pathways (e.g., magnetic media), and/or optical pathways (e.g., optical fiber), and exemplary communicative couplings include, but are not limited to, electrical couplings, magnetic couplings, and/or optical couplings.

Exemplary device 200 includes electrically conductive communicative pathways 250 carried by band 201. Pathways 250 are advantageously flexible (i.e., formed using flexible printed circuit board materials and technology) in order to accommodate bending of band 201 when device 200 is worn on the wrist of a user, but in implementations in which the band 201 itself is rigid (e.g., in some ring-like implementations) pathways 250 need not necessarily be flexible. Depending on the configuration and outputs of sensors 210, pathways 250 may route analog and/or digital signals from sensors 210 to processor 220. For example, each of sensors 210 may include or have its output routed through a respective analog-to-digital conversion circuit (not shown), or may otherwise be configured to output digital signals, and at least a portion of pathways 250 may serve as a digital bus implementing a digital protocol such as I²C or SPI.

In various implementations, sensors 210 may each include or have their respective output(s) routed through one or more amplification circuit(s) and/or one or more filtering circuit(s).

Sensors 210 are physically spaced apart from one another along band 201 so that, when band 201 is worn around a wrist of a user, each of sensors 210 has a different position relative to each of the user's fingers. For example, a first subset (e.g., one) of sensors 210 is closest (relative to the other sensors 210 in the set of sensors) to the user's index finger, a second subset (e.g., one) of sensors 210 is closest to the user's middle finger, a third subset (e.g., one) of sensors 210 is closest to the user's ring finger, and a fourth subset (e.g., one) of sensors 210 is closest to the user's pinky finger. In accordance with the present systems, articles, and methods, this configuration is an example of a configuration that enables processor 220 to distinguish between different finger-tapping gestures (i.e., finger tapping gestures involving different ones or combinations of the user's fingers) based on the signal(s) provided by one or more of sensor(s) 210 when the one or more of sensor(s) 210 detect(s) a finger tapping gesture.

Exemplary human-electronics interface device 200 includes eight individual sensors 210 that are substantially evenly spaced over the length of band 201 (or around the circumference of band 201 when band 201 is closed in an annular configuration); however, in alternative implementations a different number and/or a different spacing arrangement of sensors 210 may be employed. For example, an alternative configuration may employ four sensors 210 with the sensors spaced along the length of band 201 so that a respective sensor 210 is positioned in each respective quadrant of a perimeter of band 201 when band 201 is worn around the appendage of the user.

Throughout this specification and the appended claims, the term "finger tap" and variants such as "tapping gesture," "finger tapping gesture," and the like, are generally used to describe a physical gesture performed by a user in which at least one fingertip (and/or thumbtip) abruptly strikes a surface. The surface may be a surface that is separate from the user, such as a tabletop or a wall, or the surface may be a surface of the user, such as one of the user's thighs, one of the user's arms, or a surface of the thumb that opposes the finger(s) involved in the tapping gesture. FIGS. 3A, 3B, 3C, 3D, and 3E provide examples of finger tapping gestures in accordance with the present systems, articles, and methods.

Throughout this specification and the appended claims, reference is often made to one or more "sensor(s)," such as sensors 210 in device 200. The present systems, articles, and methods are generic to a wide variety of different sensor types that may be used to detect tapping gestures, but in accordance with the present systems, articles, and methods, tapping gestures may be advantageously detected by sensors that are responsive to vibrations (e.g., one or more vibrational impulse(s)) at the appendage of the user upon which the device is worn (e.g., at the wrist of the user) when the user performs a tapping gesture. Such vibrations may be caused by and/or propagated through any or all of: the user's skin, the user's bone(s), the user's tendon(s), and/or the user's muscle(s). That is, the sensor(s) on-board the human-electronics interface devices described herein are responsive to at least one of: muscle vibrations at the appendage of the user in response to the tapping gesture made by the user; tendon vibrations at the appendage of the user in response to the tapping gesture made by the user; bioacoustic vibrations at the appendage of the user in response to the tapping gesture made by the user; and/or mechanical vibrations at the appendage of the user in response to the tapping gesture made by the user. The "vibrations" to which the sensors described herein are responsive exist in the physical matter of the user's body and in very close proximity thereto (i.e., within a few millimeters), not (in any substantially detectable way) in the general ambient environment that is external to the user. The sensors described herein may also be responsive to vibrations that exist outside of the physical matter of the user's body (e.g., ambient sound, air currents, and so on), but the particular vibrations that are detected by sensors (210) and used to classify tapping gestures by processor (220) generally propagate on or within the appendage of the user upon which the device (200) is worn. Non-limiting examples of sensors that are responsive to such vibrations and are well-suited for use in the present systems, articles, and methods include: inertial sensors (such as accelerometers, gyroscopes, and/or inertial measurement units comprising both accelerometers and gyroscopes) and microphones (such as capacitor microphones, electrostatic microphones, piezoelectric microphones, microelectromechanical systems (MEMS) microphones, and the like). In some implementations, a single device (e.g., device 200) may include both inertial sensors and microphone sensors (e.g., at least one of sensors 210 may include an inertial sensor and at least one of sensors 210 may include a microphone sensor) and/or a single sensor (e.g., any one or all of sensors 210) may include both inertial and microphone sensing elements. Independent of the specific sensor-types employed, each sensor (210) in the set of sensors is carried by the band (201) of the human-electronics interface device (200), physically spaced-apart from the other sensors (210) in the set of sensors, and responsive to vibrations at the appendage of the user upon which the device (200) is worn when the user performs a tapping gesture involving at least one finger. In use, any or all of the sensors (210) in the set of sensors detects a vibration at the appendage of the user in response to the tapping gesture and provides at least one vibration signal to the processor in response to the detected tapping gesture. A composition of the at least one vibration signal depends at least in part on the at least one finger involved in the tapping gesture (i.e., on the relative proximity of the sensor to the finger or fingers involved in the tapping gesture). In implementations that employ at least one inertial sensor, the at least one inertial sensor may be responsive to (and used to detect) broader motions of the user's appendage, such as displacements of the user's appendage and/or rotations of the user's appendage, whether such broader motions are components of or separate from the tapping gesture.

While the various embodiments described herein are generic to a wide variety of different sensor types that may be responsive to tapping gestures, in accordance with the present systems, articles, and methods particular advantages may be realized when digital MEMS microphones are employed as some or all of the sensors (210). Some of the advantages of MEMS microphones relative to, for example, piezoelectric microphones, include the following:

- MEMS microphones generally have a stronger low frequency sensitivity, meaning that MEMS microphones are generally more sensitive than piezoelectric microphones in the lower frequency ranges (under about 200 Hz) that typically encompass the vibrations associated with finger tapping gestures;
- MEMS microphones are generally smaller (more compact) than piezoelectric microphones and are more suitable for the smaller form factors typically adopted in wearable technology;
- MEMS microphones generally consume less power than piezoelectric microphones, which translates into longer battery life and/or enables smaller batteries to be used; and/or
- MEMS microphones generally comprise a diaphragm or other surface that is substantially isolated from the external environment by a housing or other structure. The housing or other structure typically includes a small hole or input port into which vibrations may propagate through the motions of air molecules (and a small output vent to enable movement of the diaphragm). Thus, while piezoelectric microphones are typically contact microphones that are inherently directional (they are essentially responsive to only those surface vibrations that are normal to the plane of the piezoelectric contact sensor), MEMS microphones are generally non-contact microphones and "omnidirectional." When used as the sensors (210) described herein, MEMS microphones do not rely on direct physical contact with the user and are responsive to vibrations over a wider range of directions. Because of this, non-contact, omnidirectional MEMS microphones are generally more robust than contact, directional piezoelectric microphones against variations in skin properties among different users and variations in operating conditions.

An example of a MEMS microphone that is suitable for use as one or more of the sensor(s) (210) in the human-electronics interface devices (200) described herein is the MP33AB01 MEMS microphone from STMicroelectronics, coupled to a pre-amp, such as the TS472 also available from STMicroelectronics. A person of skill in the art will appreciate that the terms "omnidirectional" and "substantially omnidirectional" are used throughout this specification and the appended in a loose sense that allows for a range of responsiveness in each of numerous directions as is understood in the art.

As previously described, a tapping gesture involves at least one fingertip (or thumbtip) striking a surface (such as a surface of the thumb that opposes a fingertip or a surface of a tabletop). A tapping gesture is intrinsically abrupt and may produce a vibration characterized by a correspondingly abrupt spike in amplitude. Furthermore, the medium over or through which the vibration travels (i.e., the physical matter of the human finger, hand, wrist, and arm) is typically fairly absorptive, which may cause the vibration to damp, attenuate, or decay relatively abruptly as well. Thus, in some implementations of the present systems, articles, and methods, a vibration signal provided by a sensor (210) that is responsive to vibrations at the appendage of the user upon which the device (200) is worn when the user performs a tapping gesture may be characterized by an abrupt rise and fall in amplitude. The term "vibrational impulse" is used herein to refer to a vibration signal that propagates like a shockwave from the impact point of the tip(s) of the finger(s) involved in the tapping gesture and over or through the length of the finger(s), the hand, the wrist, and the arm of the user (depending on the strength of the impulse). In accordance with the present systems, articles, and methods, one or more sensor(s) (210) that are responsive to such vibrational impulses may be carried by a band (201) worn around the user's wrist, finger, thumb, or arm. The one or more sensor(s) (210) may detect vibrational impulses produced by tapping gestures and provide vibrational signals to a processor (220) on-board the band (201) for classification.

Figure 3A:
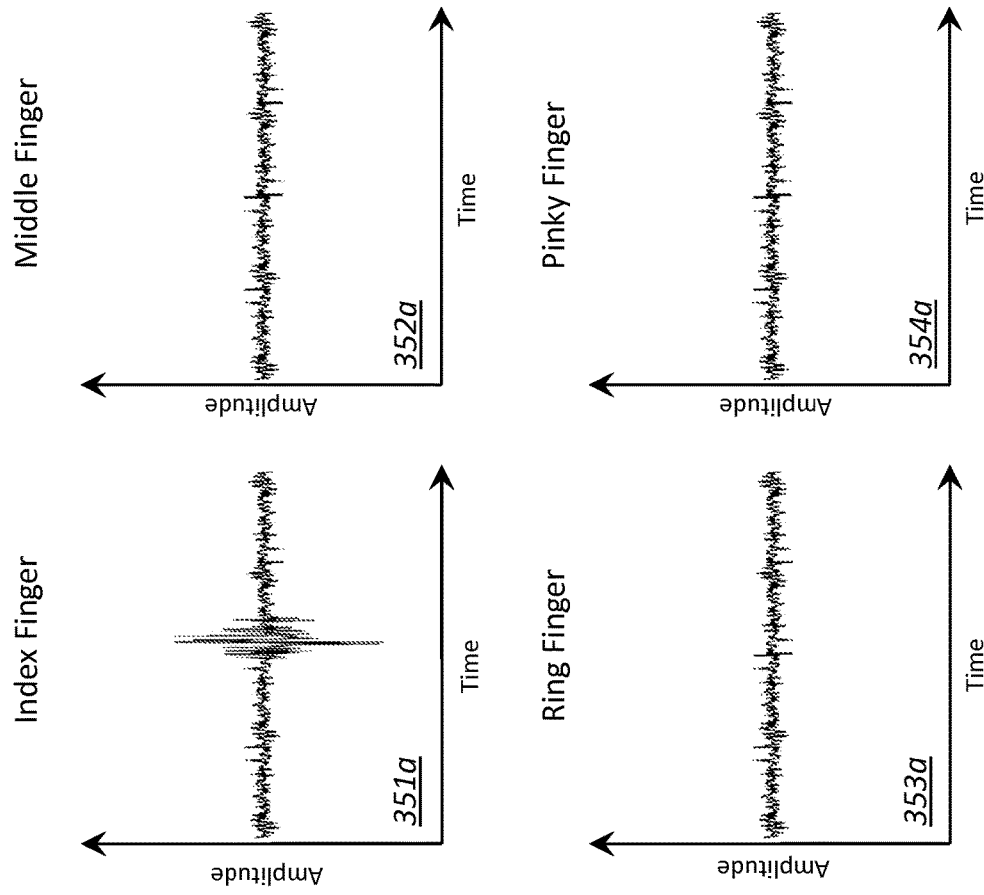
FIG. 3A is an illustrative diagram showing an exemplary wearable human-electronics interface device worn on a user's wrist and detecting vibrations produced by a first finger tapping gesture performed by the user in accordance with the present systems, articles, and methods.
Figure 3A:
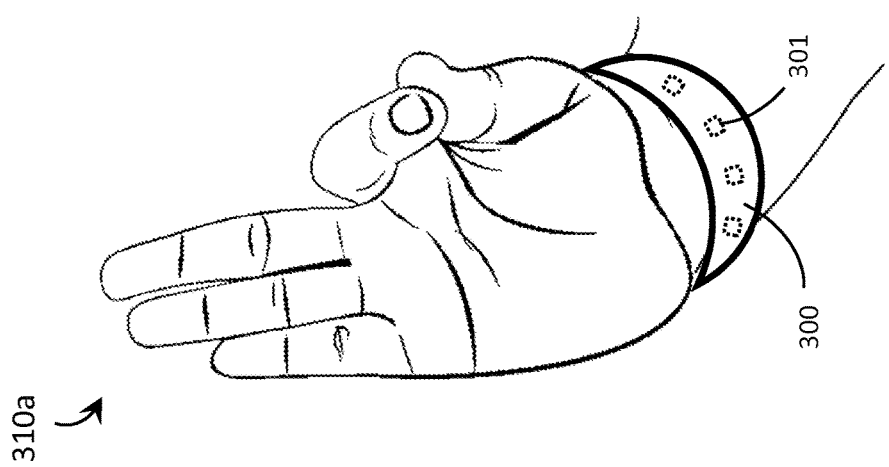

FIG. 3A is an illustrative diagram showing an exemplary wearable human-electronics interface device 300 worn on a user's wrist and detecting vibrations produced by a first finger tapping gesture 310a performed by the user in accordance with the present systems, articles, and methods. First finger tapping gesture 310a involves the index finger tapping a surface of the opposing thumb. Device 300 is substantially similar to device 200 from FIG. 2 with at least four sensors 301 visible. Sensors 301 are depicted by dashed lines in FIG.

3A to indicate that these components are contained in the inner volume(s) and/or on the underside of the wristband of device 300 and may not normally be actually visible in the view depicted in FIG. 3A, unless a transparent or translucent material is employed to form the wristband. As described previously, each of sensors 301 may comprise a respective MEMS microphone (e.g., a respective non-contact, substantially omnidirectional MEMS microphone).

In response to vibrations at the user's wrist produced by the first finger tapping gesture 310a, exemplary outputs (i.e., vibration signals) of four sensors 301 of device 300 are depicted in graphs 351a, 352a, 353a, and 354a, respectively, of FIG. 3A. Each of graphs 351a, 352a, 353a, and 354a includes an indication of to which one of the user's fingers the corresponding sensor 301 is most proximate. That is, graph 351a shows the output (i.e., vibration signal) of the sensor 301 that is most proximate the user's index finger, graph 352a shows the output (i.e., vibration signal) of the sensor 301 that is most proximate the user's middle finger, and so on.

FIG. 3A illustrates an exemplary implementation in which tapping gesture classification is based on the relative amplitudes of the vibration signals provided by each of the sensors 301 in response to the user performing a tapping gesture. Because first finger tapping gesture 310a involves tapping the index finger and no other finger(s), the sensor 301 that is most proximate the index finger detects (in the illustrative example of FIG. 3A) the strongest vibrational impulse and outputs the largest vibration signal (in terms of amplitude) as depicted in graph 351a. In accordance with the present systems, articles, and methods, the processor (220) on-board device 300 receives the vibration signals provided by each of sensors 301 (i.e., each of the respective vibration signals depicted in graphs 351a, 352a, 353a, and 354a), processes the vibration signals, and classifies the tapping gesture based on the vibration signals. Since the vibration signal 351a corresponding to the index finger shows the most substantial activity (i.e, the greatest amplitude), the processor (220) classifies first finger tapping gesture 310a as an "index finger tapping gesture."

Throughout FIGS. 3A, 3B, 3C, 3D, and 3E, the respective vibration signals of multiple sensors 301 are represented by respective graphs 351, 352, 353, and 354. The vibration signals depicted in these graphs are used for illustrative purposes only and are greatly simplified. For example, each of FIGS. 3A, 3B, 3C, 3D, and 3E illustrates only the sensor(s) 301 that is/are most proximate the finger(s) involved in a tapping gesture as detecting any appreciable vibrational impulse, but in practice more or all of sensors 301 may individually detect the vibrational impulse produced by a tapping gesture. As described above, FIG. 3A (and the same applies to FIGS. 3B, 3C, 3D, and 3E that follow) illustrates an exemplary implementation of the present systems, articles, and methods in which tapping gesture classification is based on the relative amplitudes of the vibration signals provided by a plurality of sensors 301, where the amplitude of each respective vibration signal depends, at least in part, on the proximity of the corresponding sensor 301 to the finger(s) involved in the tapping gesture. To clarify the use of graphs 351, 352, 353, and 354, the amplitudes depicted therein may be construed as relative vibration signal amplitudes (e.g., normalized amplitudes and/or differential amplitudes) so that only the sensor signal channel(s) that provide the largest amplitude(s) show a corresponding spike in graphs 351, 352, 353, and/or 354.

Figure 3B:
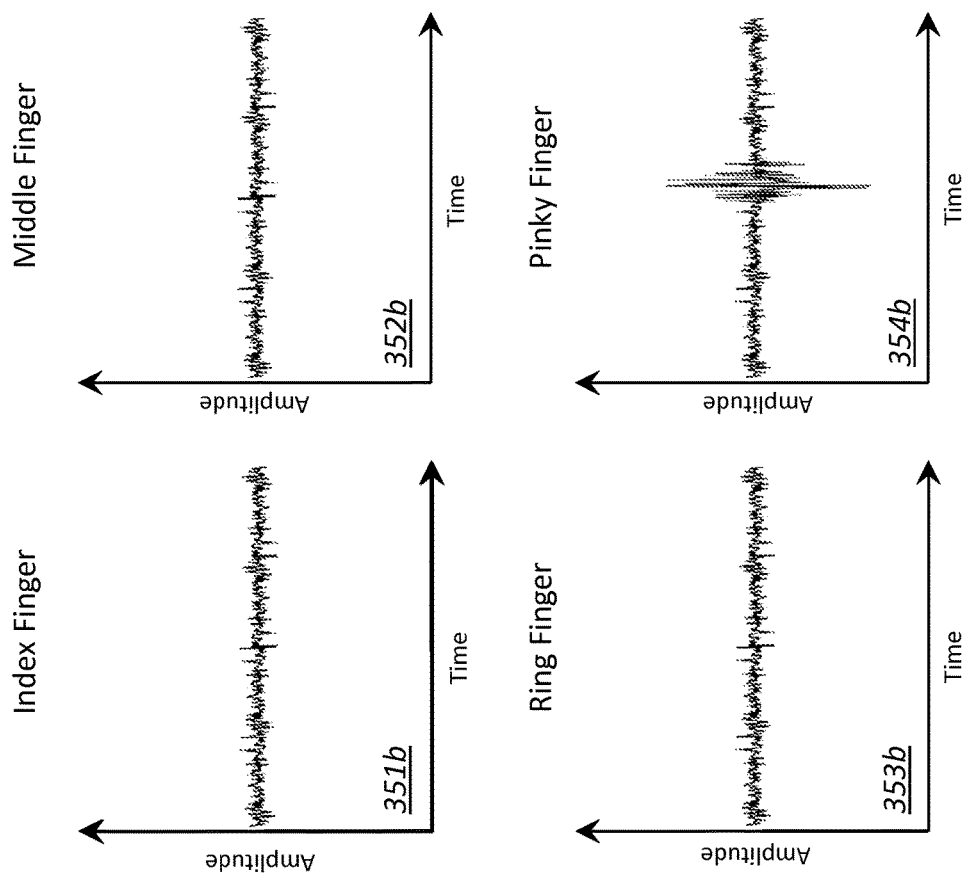
FIG. 3B is an illustrative diagram depicting the same exemplary arrangement from FIG. 3A for a second finger tapping gesture.
Figure 3B:
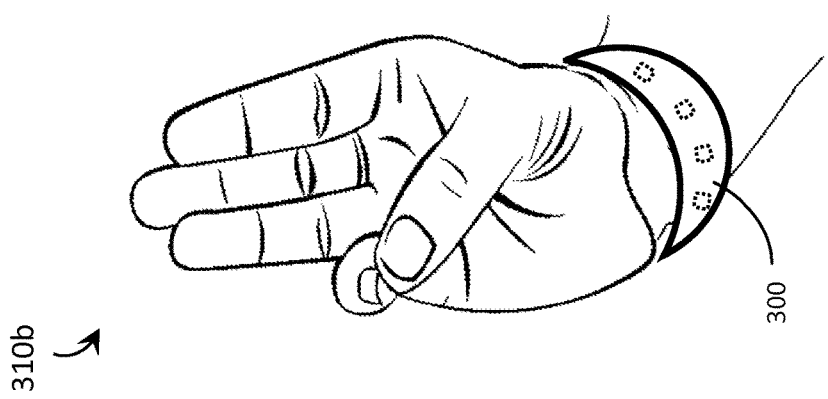

For comparison to first finger tapping gesture 310a in FIG. 3A, FIG. 3B is an illustrative diagram depicting the same exemplary arrangement for a second finger tapping gesture 310b. Second finger tapping gesture 310b involves the pinky finger tapping a surface of the opposing thumb. Sensors 301 on-board device 300 detect vibrations at the user's wrist produced by second finger tapping gesture 310b and, as depicted in graphs 351b, 352b, 353b, and 354b, the sensor 301 that is most proximate the pinky finger detects the strongest vibrational impulse and, accordingly, provides a vibration signal having the largest amplitude (per graph 354b). The processor (220) receives the vibration signals depicted in graphs 351b, 352b, 353b, and 354b and classifies second finger tapping gesture 310b as a "pinky finger tapping gesture" based on these vibration signals.

Figure 3C:
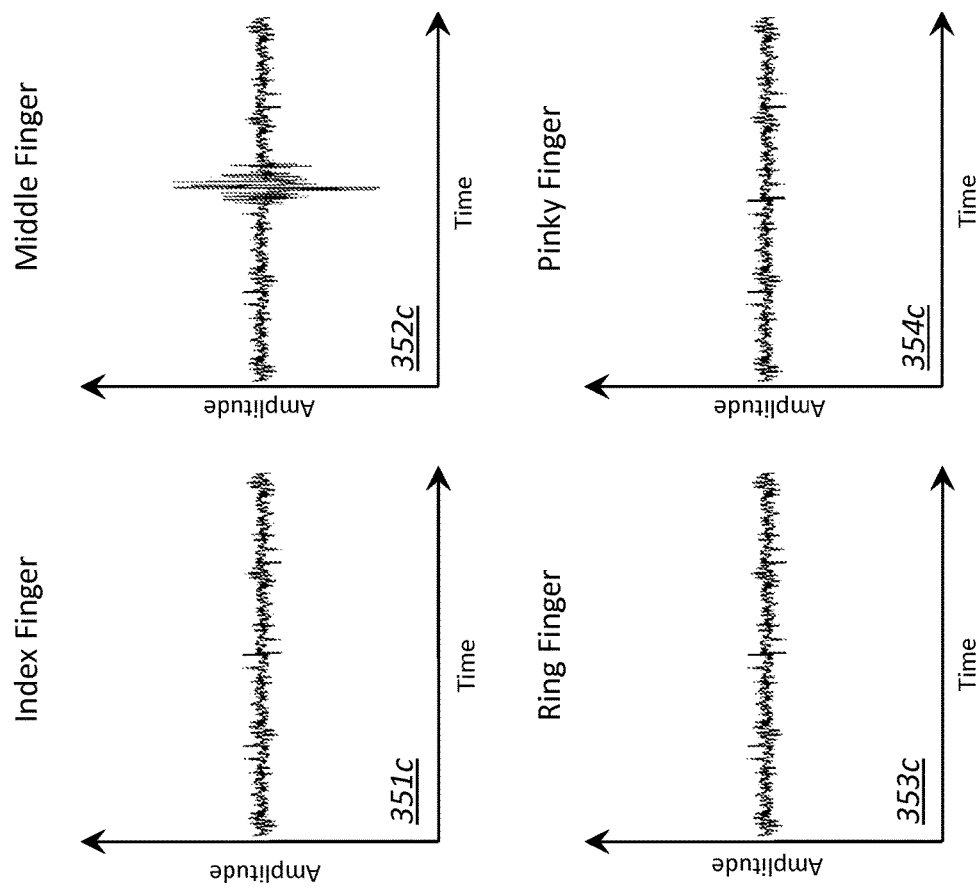
FIG. 3C is an illustrative diagram depicting the same exemplary arrangement from FIG. 3A for a third finger tapping gesture.
Figure 3C:
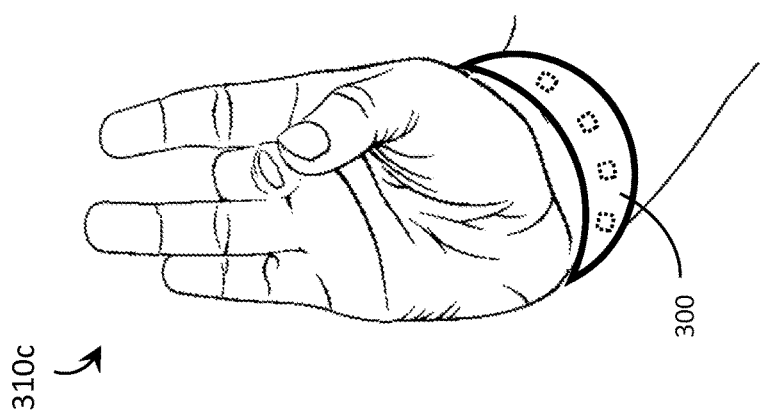

For further comparison, FIG. 3C is an illustrative diagram depicting the same exemplary arrangement as FIGS. 3A and 3B for a third finger tapping gesture 310c. Third finger tapping gesture 310c involves the middle finger tapping a surface of the opposing thumb. Sensors 301 on-board device 300 detect vibrations at the user's wrist produced by third finger tapping gesture 310c and, as depicted in graphs 351c, 352c, 353c, and 354c, the sensor 301 that is most proximate the middle finger detects the strongest vibrational impulse and, accordingly, provides a vibration signal having the largest amplitude (per graph 352c). The processor (220) receives the vibration signals depicted in graphs 351c, 352c, 353c, and 354c and classifies third finger tapping gesture 310c as a "middle finger tapping gesture" based on these vibration signals.

Figure 3D:
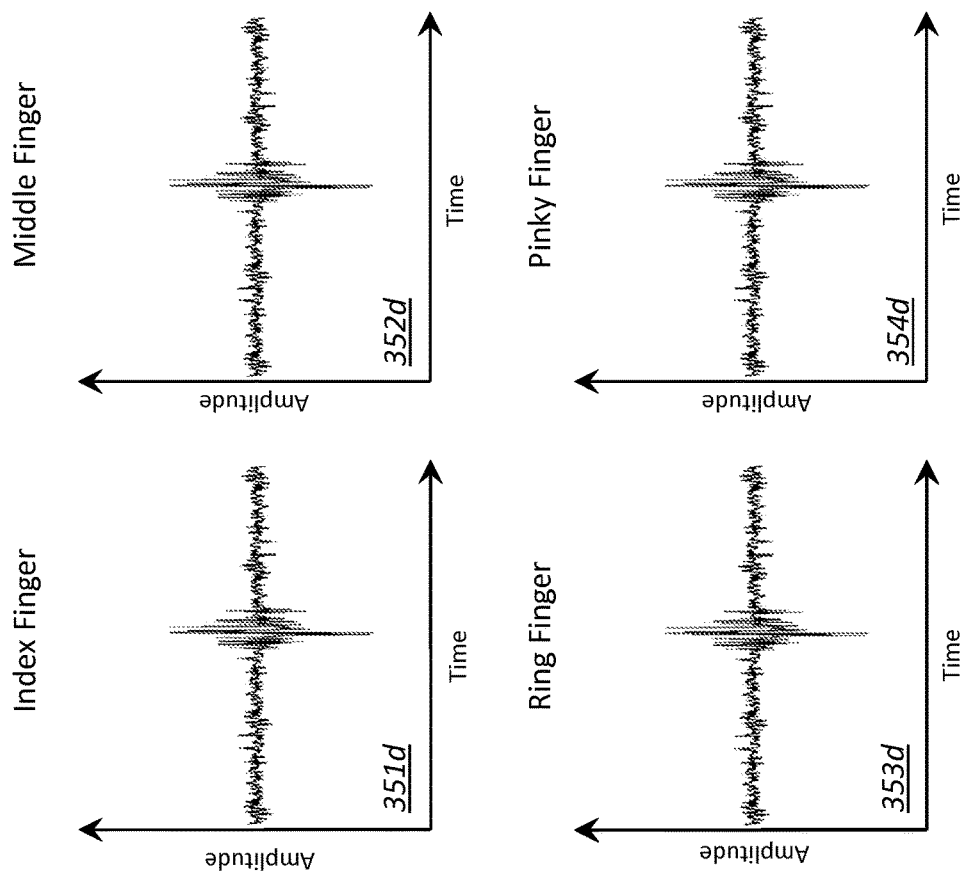
FIG. 3D is an illustrative diagram depicting the same exemplary arrangement from FIG. 3A for a fourth finger tapping gesture.
Figure 3D:
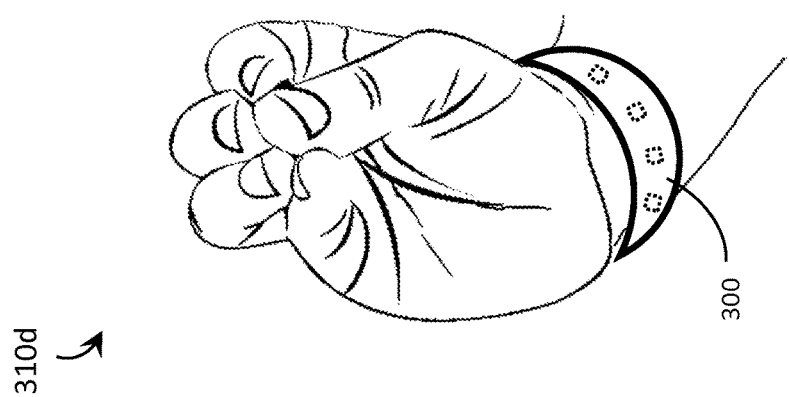

To illustrate a tapping gesture that involves multiple fingers, FIG. 3D is an illustrative diagram depicting the same exemplary arrangement as FIGS. 3A, 3B, and 3C for a fourth finger tapping gesture 310d. Fourth finger tapping gesture 310d involves all four fingers (i.e., the index finger, the middle finger, the ring finger, and the pinky finger) all tapping a surface of the opposing thumb. Sensors 301 on-board device 300 detect vibrations at the user's wrist produced by fourth finger tapping gesture 310d and, as depicted in graphs 351d, 352d, 353d, and 354d, all four sensors 301 detect a strong vibrational impulse and, accordingly, provide corresponding vibration signals having large amplitude. The processor (220) receives the vibration signals depicted in graphs 351d, 352d, 353d, and 354d and classifies fourth finger tapping gesture 310d as an "all finger tapping gesture" based on these vibration signals.

To illustrate tapping on an alternative surface (i.e., on a surface other than that of the opposing thumb), FIG. 3E is an illustrative diagram depicting the same exemplary arrangement as FIGS. 3A, 3B, 3C, and 3D for a fifth finger tapping gesture 310e. Fifth finger tapping gesture 310e involves the index finger tapping a surface that is off of the user's body, such as a tabletop surface. Sensors 301 on-board device 300 detect vibrations at the wrist of the user produced by fifth finger tapping gesture 310e and, as depicted in graphs 351e, 352e, 353e, and 354e, the sensor 301 that is most proximate the index finger detects the strongest vibrational impulse and, accordingly, provides a vibration signal having the largest amplitude (per graph 351e). The processor (220) receives the vibration signals depicted in graphs 351e, 352e, 353e, and 354e and classifies fifth finger tapping gesture 310e as an "index finger tapping gesture" based on these vibration signals.

A person of skill in the art will appreciate that a hand having four fingers may be used to produce a set of at least fifteen unique finger tapping gestures. That is, four finger tapping gestures that each involve a respective individual finger ($_4C_1$, or "4 choose 1"), six finger tapping gestures that each involve a respective pair of fingers ($_4C_2$), four finger tapping gestures that each involve a respective set of three fingers ($_4C_3$), and one finger tapping gesture that involves all four fingers ($_4C_4$). In practice, some of these finger tapping gestures may be more practical than others (by virtue of being easier to perform and/or easier to distinguish based on their corresponding vibration signals). In accordance with the present systems, articles, and methods, a processor (220) on-board a wearable human-electronics interface device (200) may classify discrete, "single tap" finger tapping gestures based on the particular finger or fingers involved in the single tap. Furthermore, a processor (220) on-board a wearable human-electronics interface device (200) may classify sequential, "multi-tap" finger tapping sequences based on the particular finger or fingers involved in a sequence of multiple taps. Examples of sequential "multi-tap" gestures include: two instances of second finger tapping gesture 310b in close succession (e.g., within about two seconds of one another), first gesture 310a followed quickly by (i.e., within about 2 seconds) fourth finger tapping gesture 310e, two instances of third finger tapping gesture 310c followed by an instance of first finger tapping gesture 310a, and so on. Both "single tap" and "multi-tap" finger tapping gestures may be used to control, operate, or otherwise interact with a separate electronic device via a wearable human-electronics interface device (100, 200, 300) in accordance with the present systems, articles, and methods.

Furthermore, the sensors 301 may be responsive to vibration signals generated by the user's finger(s) without necessarily requiring a tapping gesture. For example, MEMS microphones may be responsive to vibration signals generated by other non-tap finger movements, such as finger "flick" gestures, finger "rubbing" gestures, and so on.

FIGS. 3A, 3B, 3C, 3D, and 3E illustrate an exemplary implementation in which tapping gesture classification is based on the relative amplitudes of the vibration signals provided by a plurality of sensors 301, where the amplitude of each respective vibration signal depends on the proximity of the corresponding sensor 301 to the finger(s) involved in the tapping gesture. However, this is just one example of a classification scheme in accordance with the present systems, articles, and methods. In general, the processor (220) of the wearable human-electronics interface devices (200, 300) described herein, in use, classifies a tapping gesture based at least in part on one or more vibration signal(s) provided by one or more sensor(s) in response to a vibration at the appendage upon which the device is worn when the user performs a tapping gesture. The classification itself may be performed according to a wide variety of different schemes depending on the particular implementation. As examples, when at least two sensors are included in the interface device and at least two corresponding vibration signals are provided therefrom, the classification may involve: determining, by the processor, the relative amplitudes of the first vibration signal and the second vibration signal (as described in FIGS. 3A, 3B, 3C, 3D, and 3E); determining, by the processor, a temporal difference between at least one feature of the first vibration signal and at least one feature of the second vibration signal; determining, by the processor, a phase difference between at least one feature of the first vibration signal and at least one feature of the second vibration signal; comparing, by the processor, the first vibration signal and the at least a second vibration signal to at least one template that is representative of a defined tapping gesture; and/or executing, by the processor, an algorithm from the field of artificial intelligence or machine learning (e.g., a pattern recognition algorithm) to classify the tapping gesture based at least in part on the first vibration signal and/or the at least a second vibration signal.

Figure 4:
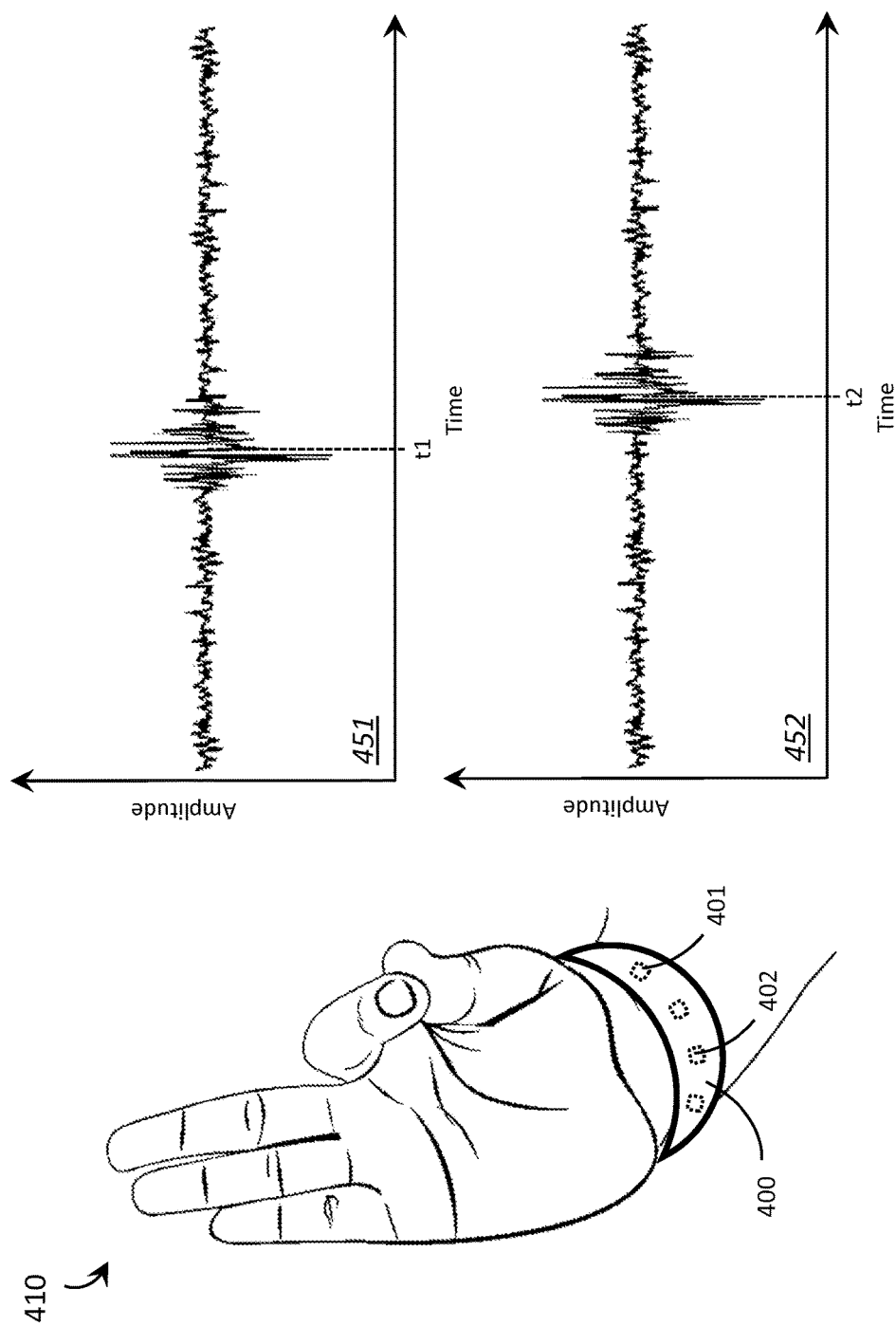
FIG. 4 is an illustrative diagram showing an exemplary wearable human-electronics interface device worn on a user's wrist and detecting vibrations produced by a first finger tapping gesture performed by the user in accordance with the present systems, articles, and methods.

FIG. 4 is an illustrative diagram showing an exemplary wearable human-electronics interface device 400 worn on a user's wrist and detecting vibrations produced by a first finger tapping gesture 410 performed by the user in accordance with the present systems, articles, and methods. FIG. 4 (and device 400 depicted therein) is substantially similar to FIG. 3A (and device 300 depicted therein) except that FIG. 4 illustrates an exemplary implementation in which tapping gesture classification is based on a temporal difference between at least one feature of a first vibration signal from a first sensor 401 and at least one feature of a second vibration signal from a second sensor 402. The output of first sensor 401 is represented by graph 451 and the output of second sensor 402 is represented by graph 452. Tapping gesture 410 involves the index finger tapping a surface of the opposing thumb (in the same way as described for FIG. 3A). In accordance with the present systems, articles, and methods, tapping gesture 410 produces a vibrational impulse that is detected at the user's wrist, at least to some extent, by all of the sensors (including first sensor 401 and second sensor 402) carried on the wristband of device 400. In the illustrative example, first sensor 401 is positioned the closest (relative to the positions of the other sensors) to the point of impact between the index finger and thumb during tapping gesture 410. Compared to first sensor 401, second sensor 402 is positioned further away from this point of impact. The relative positions of first sensor 401 and second sensor 402 cause first sensor 401 to detect and respond to the vibrational impulse produced by tapping gesture 410 slightly before second sensor 402 detects and responds to the same vibrational impulse. This "temporal difference" is illustrated in graphs 451 and 452. Graph 451 represents the vibration signal output by first sensor 401 with an amplitude spike at time t1 corresponding to detection by first sensor 401 of the vibrational impulse from tapping gesture 410. Graph 452 represents the vibration signal output by second sensor 402 with an amplitude spike at time t2 corresponding to detection by second sensor 402 of the vibrational impulse from tapping gesture 410. The temporal difference is given by t2−t1. Device 400 may include an on-board memory that stores processor-executable tapping gesture classification instructions that, when executed by the on-board processor of device 400, cause the processor to classify tapping gesture 410 as a "single index finger tap" based at least in part on the temporal difference t2−t1 between the vibrational signal provided by first sensor 401 and the vibrational signal provided by second sensor 402.

As previously described, the various embodiments described herein are generic to a wide variety of sensor types and classification schemes. Nevertheless, a generalized method of operating a wearable human-electronics interface device that accommodates the wide variety of sensor types and classification schemes is now described.

Figure 5:
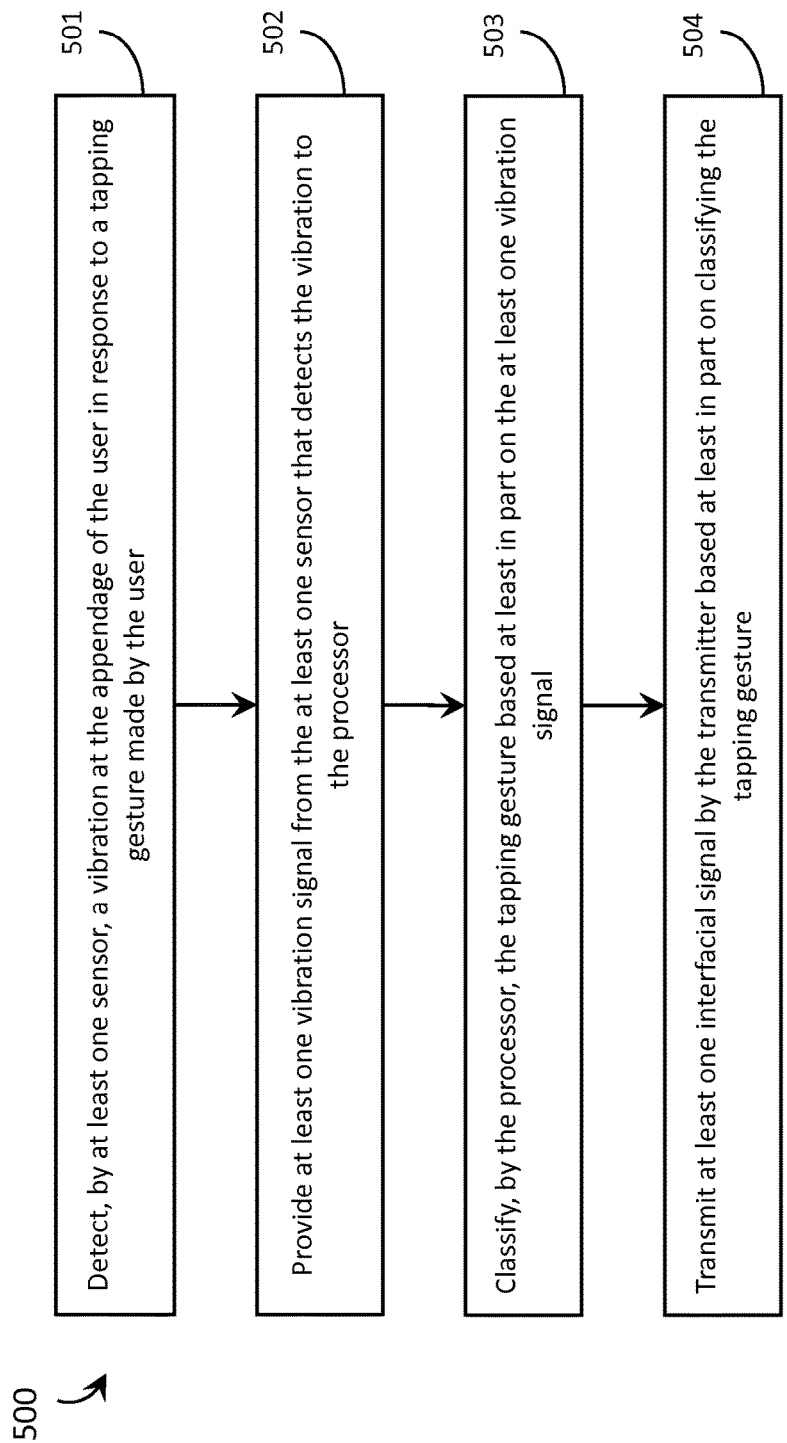
FIG. 5 is a flow-diagram showing a method of operating a wearable human-electronics interface device in accordance with the present systems, articles, and methods.

FIG. 5 is a flow-diagram showing a method 500 of operating a wearable human-electronics interface device (e.g., 100, 200, 300, 400) in accordance with the present systems, articles, and methods. The wearable human-electronics interface device (100, 200, 300, 400) comprises a band (201) that in use is worn on an appendage (e.g., a wrist, arm, finger, or thumb) of a user, a set of sensors (210) carried by the band and physically spaced apart from one another, a processor (220) carried by the band (201) and communicatively coupled to each sensor (210), and a transmitter (240) carried by the band and communicatively coupled to the processor (220). As previously described, at least one of the sensors (210) may advantageously include a digital MEMS microphone. Method 500 includes four acts 501, 502, 503, and 504, though those of skill in the art will appreciate that in alternative embodiments certain acts may be omitted and/or additional acts may be added. Those of skill in the art will also appreciate that the illustrated order of the acts is shown for exemplary purposes only and may change in alternative embodiments. To exemplify the relationship between the acts of method 500 and the elements of the exemplary human-electronics interface devices described herein, reference to elements of device 200 from FIG. 2 are included in parentheses throughout the description of method 500. However, a person of skill in the art will appreciate that method 500 may be implemented using other forms of wearable human-electronics interface devices.

At 501, at least one sensor (210) of the wearable human-electronics interface device (200) detects a vibration at the appendage of the user when the user performs a tapping gesture involving at least one finger (i.e., at least one of the user's fingers on the hand corresponding to the appendage upon which the device (200) is worn. E.g., at least one of the fingers on the user's right hand if the device (200) is worn on the user's right wrist). As described previously, the tapping gesture may comprise one or multiple fingers tapping one time or a sequence of times, and on a surface that is either part of or separate from the user.

At 502, the at least one sensor (210) that detects the vibration at the user's appendage provides at least one vibration signal to the processor (220) on-board the wearable human-electronics device (200) (through, for example, a digital bus 250) in response to the detected tapping gesture.

At 503, the processor (220) classifies the tapping gesture based at least in part on the at least one vibration signal provided at 502. As an example, the processor (220) may compare the relative amplitudes (and/or time or phase data corresponding thereto) of the vibration signals coming from each of the sensors (210) and classify the tapping gesture based at least in part on such comparison. In some implementations, the processor (220) may compare the amplitude of the vibration signal from each sensor (210) to a threshold value and determine that a finger was involved in the tapping gesture if the vibration signal(s) that represent that finger (e.g., based on proximity of the corresponding sensor (210) to that finger) exceed the threshold. Some implementations may employ any of a wide variety of pattern matching and machine intelligence techniques.

At 504, the transmitter (240) on-board the device (200) transmits at least one interfacial signal based at least in part on classifying the tapping gesture by the processor at 503. The at least one interfacial signal transmitted by the transmitter (240) may be received by one or more downstream electronic device(s) to effect control of, an operation or function of, and/or interaction with the downstream electronic device(s). In this way, the wearable human-electronics interface device (200) provides a communicative link (i.e., an interface) between a human (i.e., the user) and electronics (i.e., at least one downstream electronic device that receives and responds to the interfacial signal transmitted at 504).

In some implementations, the wearable human-electronics interface device (200) may include an on-board non-transitory processor-readable storage medium or memory (230) that stores processor-executable tapping gesture classification instructions (231). In this case, method 500 may comprise executing the processor-executable tapping gesture classification instructions (231) by the processor (220) to cause the processor (220) to classify the tapping gesture based at least in part on the at least one vibration signal per act 503.

Throughout this specification and the appended claims, the term "vibrational impulse" is often use to describe an action or event that is detected by a wearable human-electronics interface device (200). The wearable human-electronics interface devices (200) described herein may detect the impact force of a finger tap (generically, a "finger tapping impulse") as a spike in vibrational activity because a finger tap is a jarring action. However, in implementations where sensors (210) include at least one inertial sensor, the at least one inertial sensor may also be used to detect larger, more continuous motions. For example, the wearable human-electronics interface devices (200) described herein may be used to control one or more on-screen cursor(s) through, for example, swiping gestures involving motion of the appendage upon which the device (200) is worn. Thus, method 500 of FIG. 5 may further include: detecting, by the at least one inertial sensor (210), a displacement and/or rotation of the user's appendage; providing at least one displacement signal and/or at least one rotation signal from the at least one inertial sensor (210) that detects the displacement and/or rotation to the processor (220) in response to detecting the displacement and/or rotation; and classifying, by the processor (220), the displacement and/or rotation based on the at least one displacement signal and/or rotation signal. Displacement and/or rotation of the user's appendage may be classified as part of or separate from a finger tapping gesture. Thus, transmitting at least one interfacial signal by the transmitter (240) based at least in part on classifying the tapping gesture per act 504 may include transmitting at least one interfacial signal by the transmitter (240) based at least in part on classifying the displacement and/or rotation, either as part of the same interfacial signal or as a distinct, separate interfacial signal.

In accordance with the present systems, articles, and methods, a "tapping gesture" may involve a vibrational impulse that, when detected by one or more inertial sensor(s) (210), is characteristically different and distinguishable from at least most other motions/accelerations (e.g., displacement and/or rotation) detectable by the inertial sensor(s) (210). For example, a tapping gesture may involve an abrupt (i.e., sudden), brief (i.e., short duration, on the order of milliseconds or less), and strong (i.e., large amplitude) vibrational impulse that is characterized by a distinct spike in the vibration signal(s) provided by one or more inertial sensor(s) (210). A spike that is indicative of a tapping gesture may also characterize an element of recoil as the user's hand naturally and automatically "bounces back" to its original position. In accordance with the present systems, articles, and methods, the processor-executable tapping gesture classification instructions (231) stored in the memory (230) of a wearable human-electronics interface device (200) may be specifically tuned to distinguish tapping gestures (e.g., a specific subset of potential tapping gestures) from other vibrational/inertial events based on the vibration signal(s) from one or more inertial sensor(s) (210).

Throughout this specification and the appended claims, the terms "vibration signal" and "interfacial signal" are often used. Unless the specific context requires otherwise, a vibration signal is a signal output or otherwise transmitted by a sensor (210) in response to the sensor detecting a vibration at the user's appendage upon which the device is worn, and an interfacial signal is a signal output or otherwise transmitted by a wearable human-electronics interface device (200), i.e., by a transmitter (240) thereof, in order to effect control of, an operation or function of, or a general interaction with a receiving electronic device. An interfacial signal may be output by a wearable human-electronics interface device in response to processing and/or classifying one or more vibration signal(s).

As described previously, implementations of wearable human-electronics interface devices that employ one or more inertial sensor(s) in accordance with some embodiments of the present systems, articles, and methods may employ one or more inertial sensor(s) (210) in a variety of different forms, either uniformly or in combination. For example, any or all of the sensors (210) described herein may be selected from the group consisting of: an accelerometer, a linear accelerometer, a gyroscope, and/or an inertial measurement unit ("IMU") such as an MPU-9150 Nine-Axis MEMS MotionTracking™ Device from InvenSense. However, as also previously described, some implementations of wearable human-electronics interface devices may, in accordance with some embodiments of the present systems, articles, and methods, employ one or more microphone(s) (e.g., digital MEMS microphones) either instead of or in addition to one or more inertial sensor(s).

Though the sensors described herein may be advantageously configured to couple to vibrations in or on the user's body as opposed to vibrations in the user's external environment, detection of some ambient or "background" vibration activity may occur (in particular in implementations employing one or more microphone(s)). In order to mitigate the effect of detected background vibrations on the classification processes (e.g., act 503 of method 500) described herein, some implementations of the wearable human-electronics interface devices may employ systems and methods for active noise reduction. For example, a human-electronics interface device may, in accordance with the present systems, articles, and methods, include a vibration source carried by the band, and operation of the wearable human-electronics interface device (e.g., method 500) may include at least partially cancelling a background vibration at the appendage of the user upon which the device is worn, the background vibration caused by at least one ambient source other than the tapping gesture. At least partially cancelling the background vibration may include detecting the background vibration by at least one of the sensor(s) (or by a dedicated, outward facing sensor) and generating an interference vibration by the vibration source that destructively interferes with at least a portion of the background vibration at the appendage of the user.

In accordance with the present systems, articles, and methods, a wearable human-electronics interface device (200) may include or be designed to accommodate at least one display unit, such as a watch face or crystal (digital or analog), a smartwatch display, or another digital display technology. In implementations that include a display unit, the display unit may be communicatively coupled to the on-board processor (220). In implementations that are "designed to accommodate" at least one display unit, the band (201) of the wearable human-electronics interface device (200) may be sized and dimensioned as a general-purpose watchstrap that may fit, accommodate, or otherwise mate with most available watch faces or crystals.

The wearable human-electronics interface devices (200) described herein may be designed to be worn in a particular position and with a particular orientation (e.g., with a display unit on the top/back/posterior of the user's wrist) in order to ensure that the on-board sensors (210) are positioned in a prescribed way relative to the user's fingers (i.e., so that a particular first sensor (210) is most proximate the index finger, a particular second sensor (210) is most proximate the pinky finger, etc.). Alternatively, in some implementations the wearable human-electronics interface devices (200) described herein may automatically detect their position/orientation when first donned by a user in response to the user performing one or more reference gesture(s). For example, when the user first dons a wearable human-electronics interface device (200), the user may perform one or more prescribed finger tapping gestures and/or motion (i.e., displacement or rotational) gestures and the device (200) may automatically identify its position and/or orientation based on the one or more finger tapping gestures and/or motion gestures.

The various embodiments of systems, articles, and methods for wearable human-electronics interface devices described herein may adopt, incorporate, adapt, or otherwise be combined with the systems, articles, devices, and methods for gesture identification described in, at least: U.S. Provisional Patent Application Ser. No. 62/015,937; PCT Patent Application Serial No. PCT/US2014/057029; U.S. Non-Provisional patent application Ser. No. 14/155,107 (now US Patent Publication); U.S. Non-Provisional patent application Ser. No. 14/186,889 (now US Patent Publication); U.S. Non-Provisional patent application Ser. No. 14/276,575 (now US Patent Publication); U.S. Provisional patent application Ser. No. 61/857,105 (now U.S. Non-Provisional patent application Ser. No. 14/335,668); U.S. Provisional Patent Application Ser. No. 61/866,960 (now U.S. Non-Provisional patent application Ser. No. 14/461,044); U.S. Provisional Patent Application Ser. No. 61/869,526 (now U.S. Non-Provisional patent application Ser. No. 14/465,194); U.S. Provisional Patent Application Ser. No. 61/874,846 (now U.S. Non-Provisional patent application Ser. No. 14/476,093); U.S. Provisional Patent Application Ser. No. 61/872,569 (now U.S. Non-Provisional patent application Ser. No. 14/471,982); U.S. Provisional Patent Application Ser. No. 61/881,064 (now U.S. Non-Provisional patent application Ser. No. 14/494,274); U.S. Provisional Patent Application Ser. No. 61/894,263 (now U.S. Non-Provisional patent application Ser. No. 14/520,081); U.S. Provisional Patent Application Ser. No. 61/887,193 and U.S. Provisional Patent Application Ser. No. 61/887,812 and U.S. Provisional Patent Application Ser. No. 61/891,694 and U.S. Provisional Patent Application Ser. No. 61/897,097 (now collectively U.S. Patent Publication US 2015-0124566 A1); U.S. Provisional patent application Ser. No. 61/915,338 (now U.S. Non-Provisional patent application Ser. No. 14/567,826); U.S. Provisional Patent Application Ser. No. 61/940,048 (now U.S. Non-Provisional patent application Ser. No. 14/621,044); U.S. Provisional Patent Application Ser. No. 61/954,379 (now U.S. Non-Provisional patent application Ser. No. 14/658,552); U.S. Provisional Patent Application Ser. No. 61/971,346 (now U.S. Non-Provisional patent application Ser. No. 14/669,878); U.S. Provisional Patent Application Ser. No. 61/978,608 (now U.S. Non-Provisional patent application Ser. No. 14/679,850); U.S. Provisional Patent Application Ser. No. 61/989,848 (now U.S. Non-Provisional patent application Ser. No. 14/704,663); and/or U.S. Provisional Patent Application Ser. No. 62/014,605; each of which is incorporated by reference herein in its entirety.

Throughout this specification and the appended claims, the term "provide" and variants such as "provided" and "providing" are frequently used in the context of signals. For example, a sensor is described as "providing at least one signal." Unless the specific context requires otherwise, the term "provide" is used in a most general sense to cover any form of providing a signal, including but not limited to: relaying a signal, outputting a signal, generating a signal, routing a signal, creating a signal, transducing a signal, and so on. For example, an inertial sensor may include components (e.g., piezoelectric, piezoresistive, capacitive, etc.) that are used to convert physical motion into electrical signals. The inertial sensor may "provide" an electrical signal by detecting motion and generating an electrical signal in response to the motion.

Throughout this specification and the appended claims, infinitive verb forms are often used. Examples include, without limitation: "to detect," "to provide," "to transmit," "to communicate," "to process," "to route," and the like. Unless the specific context requires otherwise, such infinitive verb forms are used in an open, inclusive sense, that is as "to, at least, detect," to, at least, provide," "to, at least, transmit," and so on.

The above description of illustrated embodiments, including what is described in the Abstract, is not intended to be exhaustive or to limit the embodiments to the precise forms disclosed. Although specific embodiments of and examples are described herein for illustrative purposes, various equivalent modifications can be made without departing from the spirit and scope of the disclosure, as will be recognized by those skilled in the relevant art. The teachings provided herein of the various embodiments can be applied to other portable and/or wearable electronic devices, not necessarily the exemplary wearable electronic devices generally described above.

For instance, the foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs). However, those skilled in the art will recognize that the embodiments disclosed herein, in whole or in part, can be equivalently implemented in standard integrated circuits, as one or more computer programs executed by one or more computers (e.g., as one or more programs running on one or more computer systems), as one or more programs executed by on one or more controllers (e.g., microcontrollers) as one or more programs executed by one or more processors (e.g., microprocessors, central processing units, graphical processing units), as firmware, or as virtually any combination thereof, and that designing the circuitry and/or writing the code for the software and or firmware would be well within the skill of one of ordinary skill in the art in light of the teachings of this disclosure.

When logic is implemented as software and stored in memory, logic or information can be stored on any processor-readable medium for use by or in connection with any processor-related system or method. In the context of this disclosure, a memory is a processor-readable medium that is an electronic, magnetic, optical, or other physical device or means that contains or stores a computer and/or processor program. Logic and/or the information can be embodied in any processor-readable medium for use by or in connection with an instruction execution system, apparatus, or device, such as a computer-based system, processor-containing system, or other system that can fetch the instructions from the instruction execution system, apparatus, or device and execute the instructions associated with logic and/or information.

In the context of this specification, a "non-transitory processor-readable medium" can be any element that can store the program associated with logic and/or information for use by or in connection with the instruction execution system, apparatus, and/or device. The processor-readable medium can be, for example, but is not limited to, an electronic, magnetic, optical, electromagnetic, infrared, or semiconductor system, apparatus or device. More specific examples (a non-exhaustive list) of the computer readable medium would include the following: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and other non-transitory media.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to: U.S. Provisional Patent Application Ser. No. 62/015,937; PCT Patent Application Serial No. PCT/US2014/057029; U.S. Non-Provisional patent application Ser. No. 14/155,107 (now U.S. Patent Publication); U.S. Non-Provisional patent application Ser. No. 14/186,889 (now U.S. Patent Publication); U.S. Non-Provisional patent application Ser. No. 14/276,575 (now U.S. Patent Publication); U.S. Provisional Patent Application Ser. No. 61/857,105 (now U.S. Non-Provisional patent application Ser. No. 14/335,668); U.S. Provisional Patent Application Ser. No. 61/866,960 (now U.S. Non-Provisional patent application Ser. No. 14/461,044); U.S. Provisional Patent Application Ser. No. 61/869,526 (now U.S. Non-Provisional patent application Ser. No. 14/465,194); U.S. Provisional Patent Application Ser. No. 61/874,846 (now U.S. Non-Provisional patent application Ser. No. 14/476,093); U.S. Provisional Patent Application Ser. No. 61/872,569 (now U.S. Non-Provisional patent application Ser. No. 14/471,982); U.S. Provisional Patent Application Ser. No. 61/881,064 (now U.S. Non-Provisional patent application Ser. No. 14/494,274); U.S. Provisional Patent Application Ser. No. 61/894,263 (now U.S. Non-Provisional patent application Ser. No. 14/520,081); U.S. Provisional Patent Application Ser. No. 61/887,193 and U.S. Provisional Patent Application Ser. No. 61/887,812 and U.S. Provisional Patent Application Ser. No. 61/891,694 and U.S. Provisional Patent Application Ser. No. 61/897,097 (now collectively U.S. Patent Publication US 2015-0124566 A1); U.S. Provisional Patent Application Ser. No. 61/915,338 (now U.S. Non-Provisional patent application Ser. No. 14/567,826); U.S. Provisional Patent Application Ser. No. 61/940,048 (now U.S. Non-Provisional patent application Ser. No. 14/621,044); U.S. Provisional Patent Application Ser. No. 61/954,379 (now U.S. Non-Provisional patent application Ser. No. 14/658,552); U.S. Provisional Patent Application Ser. No. 61/971,346 (now U.S. Non-Provisional patent application Ser. No. 14/669,878); U.S. Provisional Patent Application Ser. No. 61/978,608 (now U.S. Non-Provisional patent application Ser. No. 14/679,850); U.S. Provisional Patent Application Ser. No. 61/989,848 (now U.S. Non-Provisional patent application Ser. No. 14/704,663); and/or U.S. Provisional Patent Application Ser. No. 62/014,605, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a wearable human-electronics interface device, the device comprising a band that in use is worn around an appendage of a user, a set of microelectromechanical systems ("MEMS") microphones carried by the band and physically spaced apart from one another, a processor carried by the band and communicatively coupled to each MEMS microphone in the set of MEMS microphones, a wireless transmitter carried by the band and communicatively coupled to the processor, and a vibration source carried by the band, wherein the method comprises:
   detecting, by at least one MEMS microphone in the set of MEMS microphones, a vibration at the appendage of the user in response to a tapping gesture made by the user, the tapping gesture involving at least one finger of the user;
   at least partially cancelling a background vibration at the appendage of the user, the background vibration caused by at least one ambient source other than the tapping gesture, by generating an interference vibration by the vibration source that destructively interferes with at least a portion of the background vibration at the appendage of the user;
   providing at least one vibration signal from the at least one MEMS microphone that detects the vibration to the processor, wherein a composition of the at least one vibration signal depends at least in part on the at least one finger involved in the tapping gesture;
   classifying, by the processor, the tapping gesture based at least in part on the at least one vibration signal; and
   wirelessly transmitting at least one interfacial signal by the wireless transmitter based at least in part on classifying the tapping gesture by the processor.

2. The method of claim 1 wherein the human-electronics interface device further comprises at least one inertial sensor carried by the band and communicatively coupled to the processor, the method further comprising:
   detecting, by the at least one inertial sensor, motion of the appendage of the user in response to the tapping gesture made by the user; and
   providing at least one displacement signal from the at least one inertial sensor to the processor, wherein classifying, by the processor, the tapping gesture based at least in part on the at least one vibration signal includes classifying, by the processor, the tapping gesture based at least in part on both the at least one vibration signal and the at least one displacement signal.

3. The method of claim 2 wherein detecting, by the at least one inertial sensor, motion of the appendage of the user in response to the tapping gesture made by the user includes detecting at least one vibrational impulse at the appendage of the user caused by the tapping gesture.

4. The method of claim 1 wherein the wearable human-electronics interface device includes a non-transitory processor-readable storage medium carried by the band and communicatively coupled to the processor, and wherein the non-transitory processor-readable storage medium stores processor-executable tapping gesture classification instructions, the method further comprising: executing the processor-executable tapping gesture classification instructions by the processor to cause the processor to classify the tapping gesture based at least in part on the at least one vibration signal.

5. The method of claim 1 wherein the set of MEMS microphones includes a first MEMS microphone and at least a second MEMS microphone, and wherein:
   detecting, by at least one MEMS microphone in the set of sensors, a vibration at the appendage of the user in response to a tapping gesture made by the user includes detecting, by the first MEMS microphone and the at least a second MEMS microphone, the vibration at the appendage of the user;
   providing at least one vibration signal from the at least one MEMS microphone that detects the vibration to the processor includes providing a first vibration signal from the first MEMS microphone to the processor and providing at least a second vibration signal from the at least a second MEMS microphone to the processor; and
   classifying, by the processor, the tapping gesture based at least in part on the at least one vibration signal includes classifying, by the processor, the tapping gesture based at least in part on the first vibration signal and the at least a second vibration signal.

6. The method of claim 5 wherein classifying, by the processor, the tapping gesture based at least in part on the first vibration signal and the at least a second vibration signal includes at least one of:
   determining, by the processor, relative amplitudes of the first vibration signal and the second vibration signal;
   determining, by the processor, a temporal difference between at least one feature of the first vibration signal and at least one feature of the second vibration signal;
   determining, by the processor, a phase difference between at least one feature of the first vibration signal and at least one feature of the second vibration signal;
   comparing, by the processor, the first vibration signal and the at least a second vibration signal to at least one template that is representative of a defined tapping gesture; and/or
   executing, by the processor, a pattern recognition algorithm that classifies the tapping gesture based at least in part on the first vibration signal and the at least a second vibration signal.

7. The method of claim 1 wherein the set of MEMS microphones includes at least four MEMS microphones, at least one MEMS microphone positioned in each respective quadrant of a perimeter of the band when the band is worn around the appendage of the user, and wherein:
   detecting, by at least one MEMS microphone in the set of MEMS microphones, a vibration at the appendage of the user in response to a tapping gesture made by the user includes detecting, by at least one respective MEMS microphone in each respective quadrant of the perimeter the band, the vibration at the appendage of the user in response to the tapping gesture made by the user.

8. The method of claim 1 wherein the set of MEMS microphones includes a set of non-contact, substantially omnidirectional MEMS microphones and wherein:

detecting, by at least one MEMS microphone in the set of MEMS microphones, a vibration at the appendage of the user in response to a tapping gesture made by the user includes detecting, by at least one non-contact, substantially omnidirectional MEMS microphone in the set of non-contact, substantially omnidirectional MEMS microphones, a vibration at the appendage of the user in response to a tapping gesture made by the user.

9. The method of claim 1 wherein detecting, by at least one MEMS microphone in the set of MEMS microphones, a vibration at the appendage of the user in response to a tapping gesture made by the user includes detecting at least one of:
a muscle vibration at the appendage of the user in response to the tapping gesture made by the user;
a tendon vibration at the appendage of the user in response to the tapping gesture made by the user;
a bioacoustic vibration at the appendage of the user in response to the tapping gesture made by the user; and/or
a mechanical vibration at the appendage of the user in response to the tapping gesture made by the user.

10. The method of claim 1 wherein the appendage of the user around which the human-electronics interface device is, in use, worn is selected from a group consisting of: an arm of the user, a wrist of the user, a finger of the user, and a thumb of the user.

11. The method of claim 1 wherein the human-electronics interface device further comprises a background vibration sensor carried by the band, the method further comprising:
detecting, by the background vibration sensor, the background vibration caused by the at least one ambient source.

12. A human-electronics interface device comprising:
a band that, in use, is worn around an appendage of a user;
a set of microelectromechanical systems ("MEMS") microphones carried by the band, each MEMS microphone in the set of MEMS microphones physically spaced apart from the other MEMS microphones in the set of MEMS microphones, and each MEMS microphone in the set of MEMS microphones responsive to vibrations at the appendage of the user when the user performs a tapping gesture involving at least one finger;
a vibration source carried by the band;
a processor carried by the band and communicatively coupled to each MEMS microphone in the set of MEMS microphones;
a wireless transmitter carried by the band and communicatively coupled to the processor; and
a non-transitory processor-readable storage medium carried by the band and communicatively coupled to the processor, wherein the non-transitory processor-readable storage medium stores processor-executable tapping instructions that, when executed by the processor, cause the processor to cause the vibration source to at least partially cancel a background vibration at the appendage of the user, the background vibration caused by at least one ambient source other than the tapping gesture, by generating an interference vibration that destructively interferes with at least a portion of the background vibration at the appendage of the user.

13. The human-electronics interface device of claim 12, further comprising at least one inertial sensor carried by the band and communicatively coupled to the processor.

14. The human-electronics interface device of claim 12 wherein the non-transitory processor-readable storage medium stores processor-executable tapping gesture classification instructions that, when executed by the processor, cause the processor to classify the tapping gesture performed by the user based at least in part on at least one signal provided from at least one MEMS microphone in the set of MEMS microphones to the processor in response to the tapping gesture.

15. The human-electronics interface device of claim 12, further comprising:
a display unit carried by the band and communicatively coupled to the processor.

16. The human-electronics interface device of claim 12 wherein the set of MEMS microphones includes at least four MEMS microphones, at least one MEMS microphone positioned in each respective quadrant of a perimeter of the band when the band is worn around the appendage of the user.

17. The human-electronics interface device of claim 12 wherein the set of MEMS microphones includes a set of non-contact, substantially omnidirectional MEMS microphones.

18. The human-electronics interface device of claim 12 wherein each MEMS microphone in the set of MEMS microphones is responsive to at least one of:
a muscle vibration at the appendage of the user in response to the tapping gesture made by the user;
a tendon vibration at the appendage of the user in response to the tapping gesture made by the user;
a bioacoustic vibration at the appendage of the user in response to the tapping gesture made by the user; and/or
a mechanical vibration at the appendage of the user in response to the tapping gesture made by the user.

19. The human-electronics interface device of claim 12 wherein the band is sized and dimensioned to, in use, be worn around an appendage of the user selected from a group consisting of: an arm of the user, a wrist of the user, a finger of the user, and a thumb of the user.

20. The human-electronics interface device of claim 12 wherein the set of MEMS microphones includes at least eight MEMS microphones evenly spaced around a circumference of the band.

21. The human-electronics interface device of claim 12, further comprising a background vibration sensor carried by the band, the background vibration sensor responsive to the background vibration caused by the at least one ambient source.

22. The human-electronics interface device of claim 21, wherein the background vibration sensor is selected from the group consisting of: a MEMS microphone in the set of MEMS microphones, or a dedicated outward-facing sensor carried by the band.

* * * * *